Oct. 12, 1926.
G. C. STEBBINS
1,602,598
MOLD FOR BATTERY BOXES
Filed Jan. 25, 1922  3 Sheets-Sheet 2
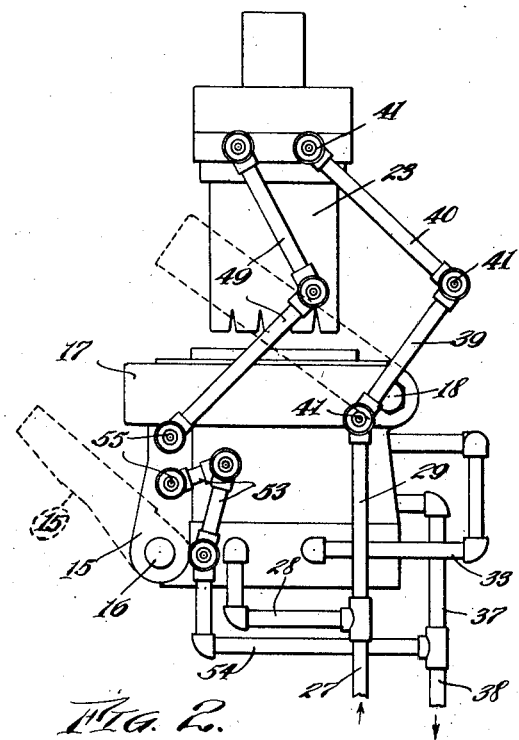
Fig. 2.
Fig. 3.
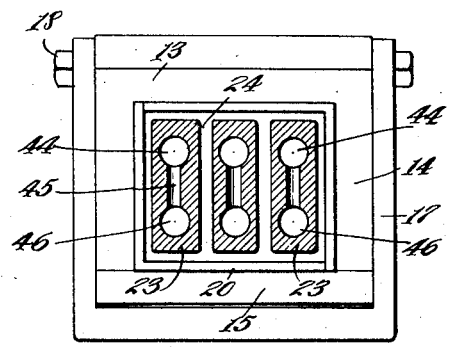
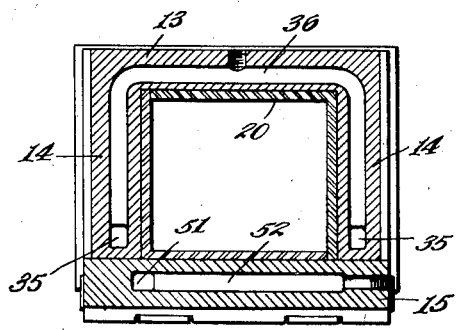
Fig. 4.
Fig. 5.
INVENTOR,
George C. Stebbins
BY Brockett & Hyde
Attys.

Oct. 12, 1926.　　　　G. C. STEBBINS　　　　1,602,598
MOLD FOR BATTERY BOXES
Filed Jan. 25, 1922　　　3 Sheets-Sheet 3

INVENTOR,
George C. Stebbins
BY Brockett & Hyde
Attys.

Patented Oct. 12, 1926.

1,602,598

UNITED STATES PATENT OFFICE.

GEORGE C. STEBBINS, OF ASHTABULA, OHIO.

MOLD FOR BATTERY BOXES.

Application filed January 25, 1922. Serial No. 531,704.

This invention relates to the manufacture of battery boxes in molds, and more particularly to the mold and the machine of which the mold forms a part.

The object of the invention is to provide improved apparatus for forming a multiple cell one piece battery box from plastic material, such as rubber or a vulcanizable compound. A further object of the invention is to improve the general construction and arrangement of the mold, so as to enable it to be readily opened for withdrawing the finished product and closed for the molding of another box, as well as to improve the circulation of heating medium to the various parts of the mold and to insure the production of a box of accurate form, size and dimensions.

Further objects of the invention are in part obvious and in part will appear more in detail hereinafter.

The invention comprises the construction and arrangement of parts hereinafter described and claimed.

Figure 1:
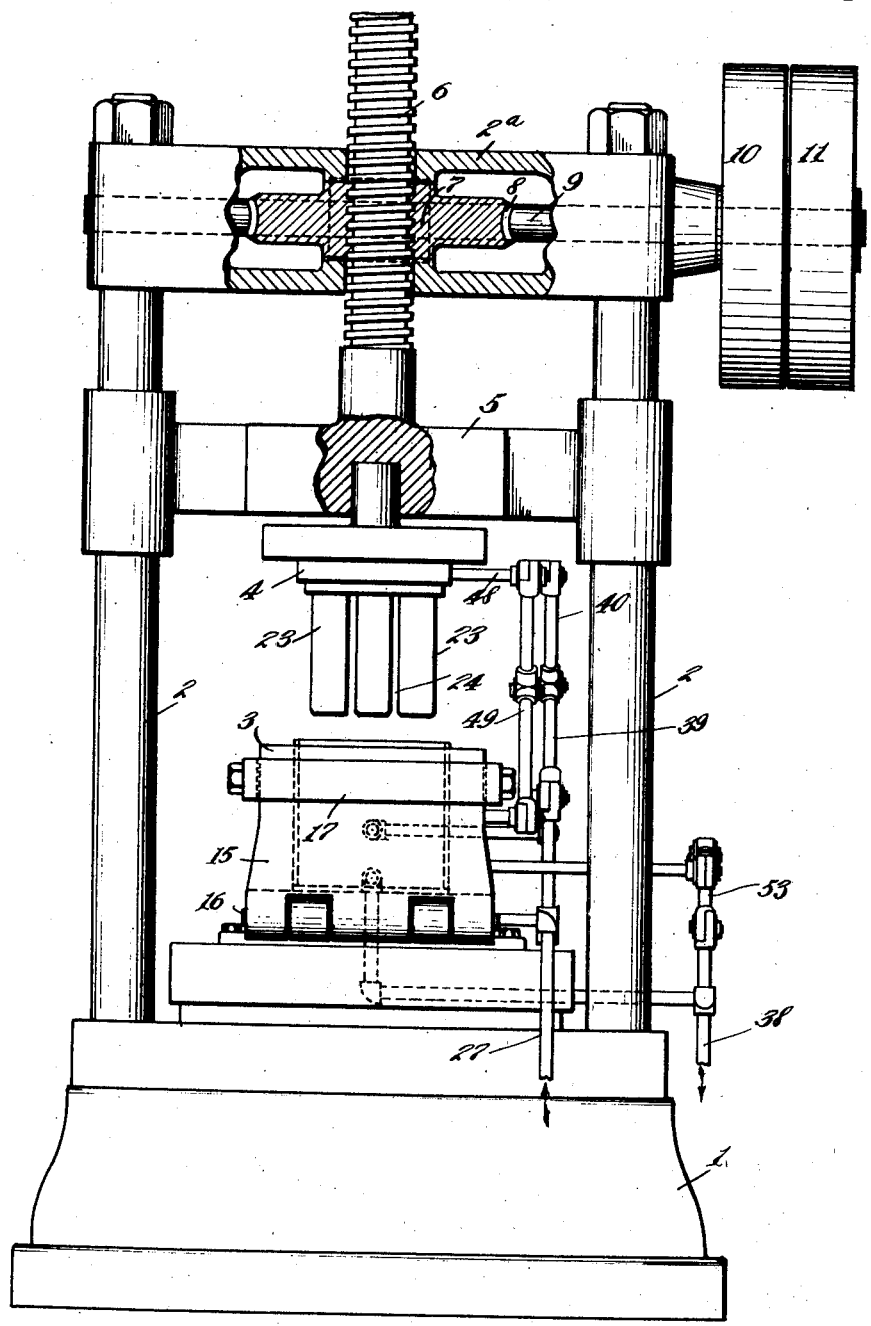
Figure 6:
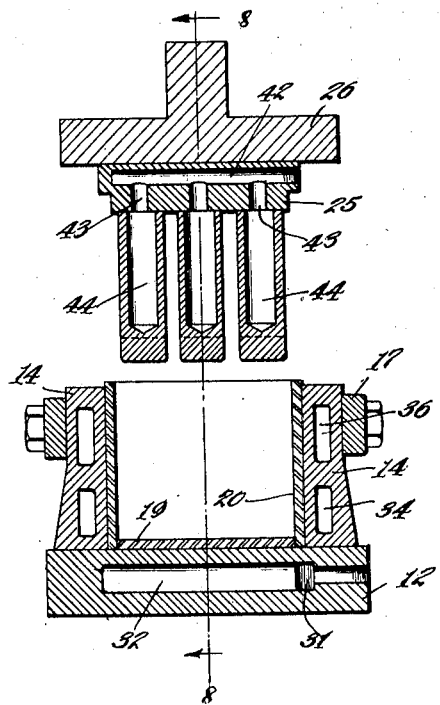
Figure 7:
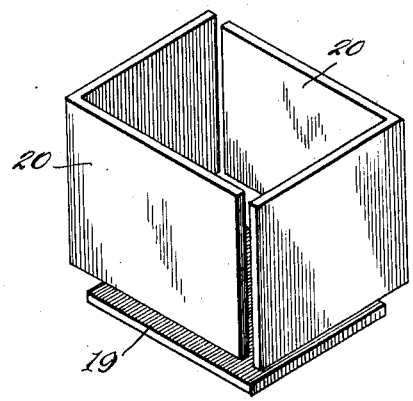
Figure 8:
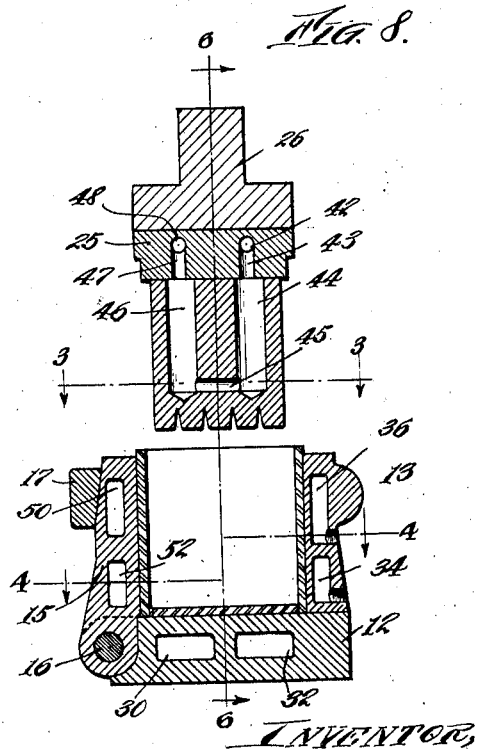

In the drawings, Fig. 1 represents a front elevation, partly broken out and in section, of a molding machine embodying the invention; Fig. 2 is a detailed side elevation of the mold and the conduits for supplying heating medium to the mold parts; Fig. 3 is a sectional plan view on the line 3—3, Fig. 8; Fig. 4 is a sectional plan view on the line 4—4, Fig. 8; Fig. 5 is a perspective view of the product of the machine; Fig. 6 is a sectional elevation on the line 6—6, Fig. 8, illustrating the interior of the mold body and core; Fig. 7 is a perspective view of the mold lining, the parts being shown separated for convenience of illustration; and Fig. 8 is a sectional elevation on the line 8—8, Fig. 6.

The machine shown in the drawings comprises a suitable frame including a heavy base 1 which forms a support for the flask or body portion of the mold to be later described, and from which rise suitable uprights such as the pillars 2, which support a head 2ª. Above the flask, indicated generally at 3, Fig. 1, is located the core 4, which is suitably attached to or supported by a cross head 5 vertically movable relative to the base or bed, so as to produce movement of the core into and out of the flask, as will appear. Any suitable operating means can be provided for producing relative motion between the flask and core. In the present machine, the cross head 5 is slidable on the pillars 2 and is provided with a threaded shank 6 cooperating with the threads in a nut 7, the periphery of which is formed as a worm wheel 8 to cooperate with a worm (not shown) on a shaft 9 provided with fast and loose belt pulleys 10, 11.

The flask comprises a bottom portion or floor 12, rear and side walls 13, 14, all either integral or rigidly secured to each other, as well as a front wall 15 hinged on a horizontal axis, such as on the shaft 16, to the floor 12 so that it can be turned down into the dotted line position, Fig. 2, if desired, to enable the finished battery box to be withdrawn from the flask. When the mold is closed, as shown in Fig. 8, the front wall 15 is held rigidly to its place by a U-shaped yoke 17 hinged to the rear wall on the axis 18, so that said yoke can be swung up to the dotted line position, Fig. 2, to enable the front wall to be dropped down. All of these parts, to wit, the floor and the back, side and front walls are provided with hollow internal cavities through which a heating medium may be circulated, as will more fully hereinafter appear. These walls and bottom together form a rectangular cavity in which is placed a suitable lining made, for example, as shown in Fig. 7, of three pieces, to wit, a bottom plate 19, and two L-shaped angle members 20 forming the side walls. This lining can be made of finished steel or other suitable material with smooth accurate surfaces and is readily replaceable when worn or warped so that an accurately finished product is always insured.

The battery box to be produced in the present machine is illustrated in detail in Fig. 5. It comprises side walls 21, a bottom (not shown), and one or more (two being shown) cross partitions 22 to form a plural cell battery box. The core 4 is therefore provided with several core portions, one for each of the several cells in the battery box. In the form shown, the core is provided with three core portions 23 separated by hollow spaces 24 in which the cross partitions 22 are formed. These core portions are either integral with or rigidly attached to a body portion 25 having a base 26 for attachment to the cross head 5, and said body portion 25 and core portions 23 are hollowed out to enable the heating medium to be circulated therethrough, just as with the flask.

The mold shown in the drawings may be heated by any suitable heating medium, such as steam. 27 indicates the steam inlet pipe connected to any suitable source of steam, either that for operating the machine (if the machine is operated by steam pressure, as may be the case) or to an outside source, as will be readily understood. Steam flows from this pipe to the branch pipes 28, 29, the first of which communicates with a cavity 30 in the floor 12 communicating by a cross passage 31 with a similar cavity 32, from which the steam flows by a pipe 33 to a cavity 34 in the back and side walls 13, 14, said cavity 34 communicating at its ends by passages 35 with a similar cavity 36, from which the steam flows by a pipe 37 to the exhaust pipe 38. Since the bottom 12, back wall 13 and side walls 14 are stationary, all the pipes so far referred to may be stationary.

The other branch 29 of pipe 27 includes two movable portions 39, 40 connected to each other and to the neighboring pipe sections by swing joints 41. Said pipe 29 communicates with a cross channel 42 in the body portion 25 of the core, which channel communicates by passages 43 with cavities 44 in the core members, each of said cavities communicating by a cross passage 45 with a similar cavity 46 communicating with a channel 47 leading to the pipe 48 which, in turn, communicates by movable pipe sections 49 with a pipe leading to a chamber 50 in the movable front wall 15, said chamber communicating by a passage 51 with a similar chamber 52 which communicates by movable pipe members 53 with a branch pipe 54 leading to the exhaust pipe 38. The movable pipe members 49 and 53 are, of course, connected by swing joints 55 similar to the joints 41.

In use of the apparatus, the cross head 5 and core are elevated to the position shown in Figs. 1 and 2. Yoke 17 is raised to the dotted line position, Fig. 2, and the front wall 15 is dropped, as indicated in dotted lines, Fig. 2, or even further. The mold lining shown in Fig. 7 is then inserted in place and the flask is closed to the full line position, Fig. 2. A proper quantity of plastic material is then inserted into the flask, the quantity being determined by weight, volume or experience, as may be found advisable. The movable cross head 5 and core are then moved downwardly until the core portions sink into the plastic material and extrude the same upwardly causing it to flow up along the core portions and tend to flow out from the top of the flask, not only filling the cavity around the outside of the core portions but also the spaces 24 between said core portions. The downward movement of the cross head and core may be limited in any suitable manner, such as by stops or by the amount of rotation of the nut so as to insure a definite thickness of the bottom of the battery box. When the core is pushed fully down the plastic material fills all crevices and is confined under heavy pressure. The box is allowed to lie in this condition with the core therein for a suitable period, it being understood that steam or other heating medium is constantly flowing through the mold and core cavities, until the vulcanization process has been completed. Then the cross head and core are raised, yoke 17 is elevated, the front wall 15 is dropped and the box and false lining together are pulled out of the flask. The lining is then stripped from the box and returned to the flask and the formed box is either allowed to cool or, if desired, can be transferred to a heating oven and allowed to remain there for a longer period at some specified temperature to complete the curing operation.

The machine described produces accurate battery boxes, is simple to operate and is so constructed that the battery box walls may be made relatively thin as compared with prior devices of this character.

What I claim is:

1. A machine for molding multiple cell battery boxes, comprising relatively movable head and bed members, a separable flask carried by the bed, a lining within said flask, a core carried by the head and adapted to enter a battery box within said lining and provided with a plurality of separated core portions to form separate cell chambers in the battery box and having intervening spaces to form the cross walls of said box, means for producing relative movement between said head and bed members, and means for circulating heating medium through the core and flask.

2. A mold for battery boxes, comprising a flask having rigidly connected bottom, rear and side wall members, a front wall movably connected thereto to enable the flask to be opened at its front, a false lining for the cavity in said flask including separable members, and a core adapted to enter the space within said lining.

In testimony whereof I hereby affix my signature.

GEORGE C. STEBBINS.